(12) United States Patent
Massa

(10) Patent No.: US 8,320,218 B2
(45) Date of Patent: Nov. 27, 2012

(54) HIDDEN ULTRASONIC TRANSDUCER WITH BEAM ANGLE CONTROL FOR NON-CONTACT TARGET DETECTION SYSTEMS

(75) Inventor: Donald Patrick Massa, Scituate, MA (US)

(73) Assignee: Massa Products Corporation, Hingham, MA (US)

( * ) Notice: Subject to any disclaimer, the term of this patent is extended or adjusted under 35 U.S.C. 154(b) by 392 days.

(21) Appl. No.: 12/657,588

(22) Filed: Apr. 23, 2010

(65) Prior Publication Data
US 2010/0208553 A1    Aug. 19, 2010

Related U.S. Application Data

(63) Continuation-in-part of application No. 12/460,790, filed on Jul. 24, 2009, now Pat. No. 8,085,621.

(60) Provisional application No. 61/135,769, filed on Jul. 24, 2008.

(51) Int. Cl.
G01S 15/04 (2006.01)
B06B 1/06 (2006.01)

(52) U.S. Cl. .................................. 367/140; 367/909

(58) Field of Classification Search .................. 367/140, 367/93, 162, 138, 103, 909, 165, 173
See application file for complete search history.

(56) References Cited

U.S. PATENT DOCUMENTS

| | | | | | |
|---|---|---|---|---|---|
| 3,928,777 | A | * | 12/1975 | Massa | 367/152 |
| 4,011,473 | A | * | 3/1977 | Massa | 310/335 |
| 5,057,182 | A | * | 10/1991 | Wuchinich | 156/580.1 |
| 5,171,387 | A | * | 12/1992 | Wuchinich | 156/73.3 |
| 5,719,823 | A | * | 2/1998 | Earp | 367/138 |
| 8,085,621 | B2 | * | 12/2011 | Massa | 367/138 |
| 2010/0020646 | A1 | * | 1/2010 | Massa | 367/162 |
| 2010/0208553 | A1 | * | 8/2010 | Massa | 367/140 |

* cited by examiner

*Primary Examiner* — Daniel Pihulic

(57) ABSTRACT

An ultrasonic transducer utilizes a unique forward acoustic transmission line comprised of a composite structure partially consisting of a portion of a continuous smooth sheet of material, such as an automobile bumper, from which the acoustic beam is emitted. This makes it invisible to sight, thus allowing for an improved object detection system in which the sensors cannot be seen, so that they do not interfere with the smooth lines that were designed into the surface of the object or vehicle onto which they are mounted. This is a significant improvement for applications where the look and style of the surface of the platform is important, such as in automotive park assist systems.

14 Claims, 3 Drawing Sheets

HIDDEN ULTRASONIC TRANSDUCER WITH BEAM ANGLE CONTROL FOR NON-CONTACT TARGET DETECTION SYSTEMS

CROSS REFERENCE TO RELATED APPLICATIONS

This invention is a continuation-in-part of application Ser. No. 12/460,790 filed on Jul. 24, 2009, now U.S. Pat. No. 8,085,621, which claims the benefit of U.S. Provisional Application No. 61/135,769, filed on Jul. 24, 2008.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention is a continuation-in-part of the invention described in my application Ser. No. 12/460,790 that was filed as a non-provisional application on Jul. 24, 2009, now U.S. Pat. No. 8,085,621 and is concerned with further improvements in the design of electroacoustic transducers for transmitting or receiving sound in a fluid medium, as described in said co-pending application. Although not limited to the ultrasonic frequency region, this improvement in the performance characteristics of electroacoustic transducers is primarily to be used in the ultrasonic frequency region in a gaseous medium.

The teachings of this invention can be used by one skilled in the art in a wide variety of transducer designs using many different methods of transduction for sound radiation or reception in fluid or gaseous mediums. Transducers using the teachings of this invention can be designed using a wide variety of transduction materials, such as magnetostrictive rods, piezoelectric crystals, and polarized ceramic elements. However, the teachings of this invention can best be used in conjunction with ultrasonic transducers designed with polarized ceramic.

The co-pending application describes an ultrasonic transducer that utilizes an acoustic transmission line to increase the sensitivity of both the transmitting response and the receiving response. The resonant element of the transducer could employ a ceramic disc operating in the radial resonance mode for its transduction means, or it could be a half wavelength resonator utilizing a forward transmission line, a rear transmission line, and a non-resonant ceramic for transduction. The shape of the forward transmission line is designed to generate the desired acoustic radiation pattern at the frequency of resonance, which could be a broad or narrow conical beam or a fan shaped beam.

In operation, the radiating face of the transducer described in the co-pending application must be exposed to the fluid medium in order to efficiently transmit and receive sound pulses with the desired acoustic radiation patterns. Having the face of the transducer exposed is usually not a problem in most echo-ranging applications. However, in certain cases, such as sensors used in the automotive industry, having transducers mounted onto the vehicle visibly is not desirable because it interferes with the look and style of the car. Therefore, in automotive acoustic echo-ranging applications, such as park assist systems, it would be a great advantage to hide the transducers mounted onto the vehicle so that they are not visible. This invention extends the teachings of the co-pending application to allow the ultrasonic transducer to be invisibly mounted onto platforms such as automobiles.

BRIEF SUMMARY OF THE INVENTION

The objects of this invention include the objects of the co-pending application. This invention makes modifications to the forward acoustic transmission line between the vibrating surface of the transduction material and the medium into which the vibrations are to be transmitted that is described in the co-pending application. These modifications include fabricating the forward acoustic transmission line as a composite consisting partially of a portion of a continuous smooth sheet of material in a manner that results in the transducers being hidden and the acoustic beam being emitted from the continuous sheets of material.

An additional object of this invention is to provide mounting means to allow the transducer to be mechanically held in place behind the continuous sheet of material.

Another object of this invention is to provide a composite forward acoustic transmission line that is part of a transducer resonant structure that is a quarter wavelength in length and is partially comprised of a portion of a continuous smooth sheet of material, such as an automobile bumper.

Another object of this invention is to provide mounting means to attach the transducer structure behind the continuous smooth sheet of material so that its resonating structure is not visible.

A still further object of this invention is to provide a means to incorporate hidden transducers into object detection systems, such as automotive park assist systems, so that the transducers do not interfere with the smooth lines that were designed into the surface of the vehicle.

BRIEF DESCRIPTION OF THE DRAWINGS

The novel features which are characteristic of the invention are set forth with particularity in the appended claims. However, the invention itself, both as to its organization and method of operating, together with further objects and advantage thereof, will best be understood by reference to the description when taken in conjunction with the accompanying drawings in which:

DETAILED DESCRIPTION OF THE INVENTION

Figure 2:
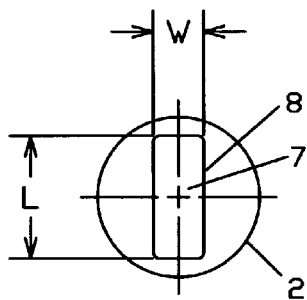
FIG. 2 is similar to FIG. 7 of the co-pending application and shows a top view of the structure shown in FIG. 1.
Figure 1:
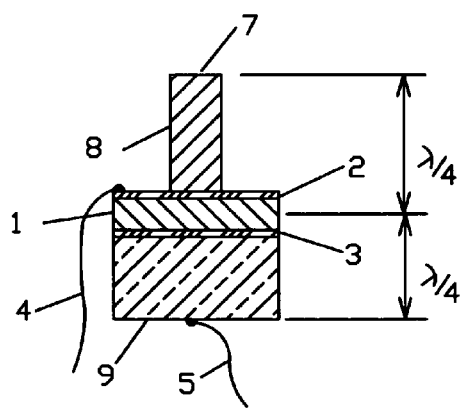
FIG. 1 is a schematic cross-sectional representation, similar to FIG. 6 of the co-pending application, showing a half wavelength resonant element of a transducer in which the forward acoustic transmission line for radiating sound into the medium is rectangular in shape, which enables it to produce a fan shaped acoustic radiation pattern containing one beam angle in the horizontal plane and another in the vertical plane.
Figure 5:
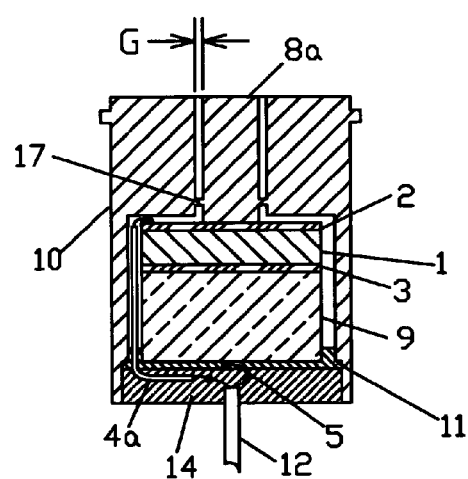
FIG. 5 is a cross-sectional view of a transducer in a housing employing the teachings of this invention that includes only the rectangular portion of the forward acoustic transmission line.
Figure 8:
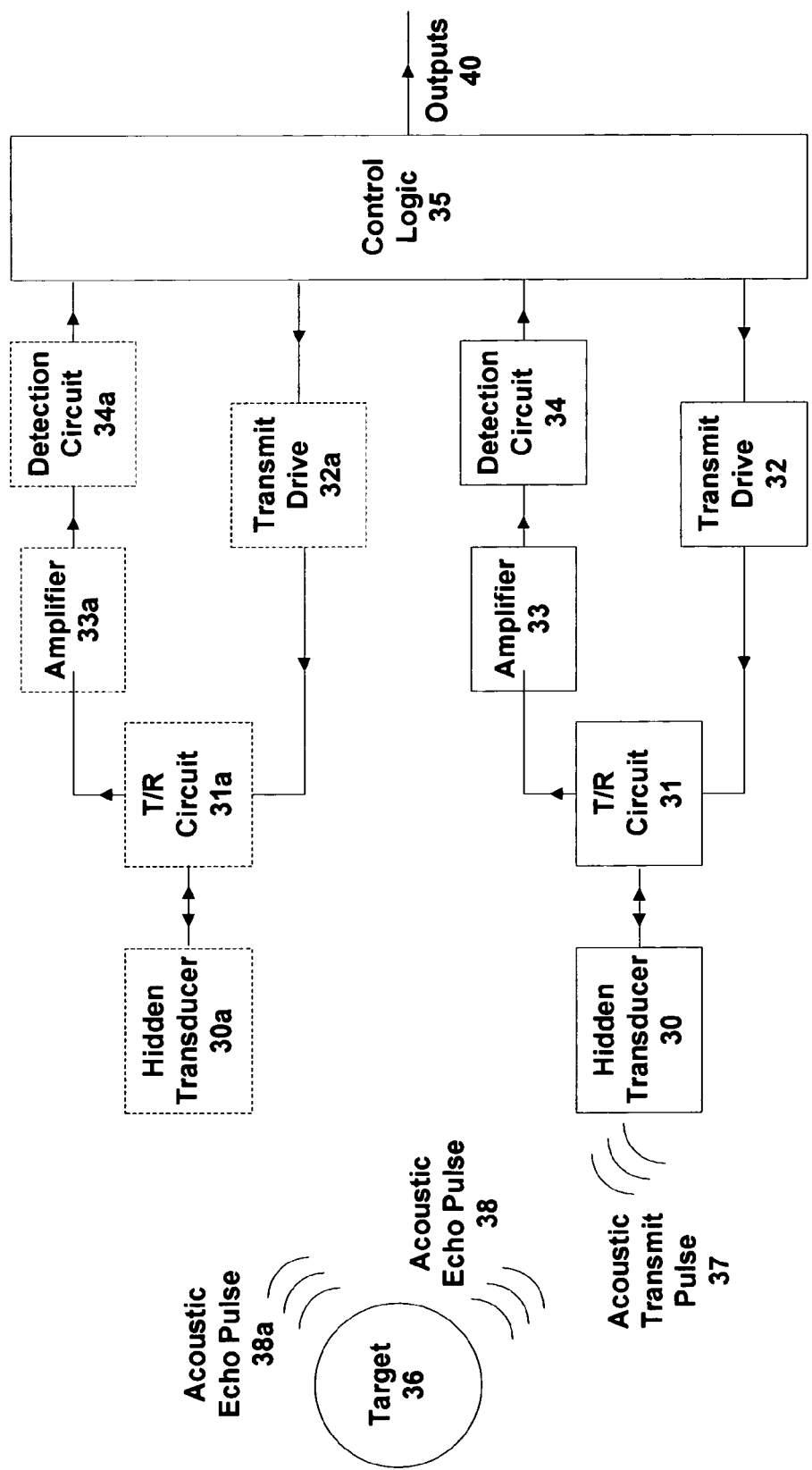
FIG. 8 is a schematic circuit block diagram showing a sensor system utilizing the teachings of this invention.

Referring more particularly to the figures, FIG. 1 shows a schematic cross-sectional of a half wavelength resonant element of a transducer that will produce a fan shaped radiation beam. This is similar to the half wavelength resonant element shown in FIG. 6 of the co-pending application. A half wavelength resonator such as shown in FIG. 5 or FIG. 8 of the co-pending application, or a quarter wavelength resonator such as shown in FIG. 1 or FIG. 2 of the co-pending application could also be used in the resonating element in FIG. 1. FIG. 2 shows a top view of the structure of FIG. 1. The transduction material consists of a thin piezoelectric ceramic disc 1, which may be any one of the well known polarized ceramic materials such as, for example, lead-zirconate-titanate or barium titanate. The flat surfaces of the ceramic disc 1 are coated with metallic electrodes 2 and 3. They could be silver, electroless nickel, or some other material as is well known in the art.

The thin ceramic disc 1 has a radial resonant frequency and a thickness resonant frequency that are both higher than the half wavelength resonant frequency, $f_L$, of the transducer element. Two acoustic transmission lines are used in the structure, the forward transmission line 8 and the rear transmission line 9. In the embodiment, the rear transmission line 9 is cylindrical, but the forward transmission line 8 has been shaped into a rectangular structure that is W wide and L long.

The cross section of the forward transmission line, the rear transmission line, and the ceramic in the transducer, could be circular, rectangular, or any other shape. The surface 7 radiates sound into the transmission medium. The wavelength of sound in the transmission medium at the resonant frequency $f_L$ is $\lambda_L$ and is equal to the speed of sound divided by $f_L$. As was described in the co-pending application, typically L would be the same dimension as the diameter of the ceramic disc 1, but it can be smaller as shown. If L is equal to the ceramic diameter, the short ends of the forward transmission line 8 could form an arc that follows the circular curve of the ceramic. This would typically make the transducer easier to fabricate. Since W is smaller than L, the ratio $L/\lambda_L$ is less than the ratio $W/\lambda_L$. This will therefore produce a large beam angle for the radiation pattern in the horizontal plane around the width of the rectangular radiating surface, and a narrower beam angle in the vertical plane around its length.

When designing half wavelength resonating structures such as this, a wide variety of materials can be used for the two transmission lines. Different materials will produce transducers with different characteristics, such as different Qs, different sensitivities, different maximum stresses, different front to back vibration ratios, and different temperature responses. The resonant element is designed to operate at the frequency of half wavelength length resonance, $f_L$. To accomplish this, the length of the forward transmission line 8 plus half of the thickness of the ceramic disc 1 is designed to be a quarter of a wavelength long at $f_L$, and the length of the rear transmission line 9 plus half the thickness of the ceramic disc 1 is also made a quarter wavelength. This makes the structure one half wavelength long at frequency $f_L$.

It has been found that different plastic and rubber materials are preferred for use in the forward transmission line 8 of FIG. 1, as is discussed in the co-pending application. Metals such as aluminum, brass, or steel are best used for the rear transmission line 9 to ensure that there is a much larger vibration amplitude produced at surface 7 that radiates the sound into the transmission medium than occurs at the open surface of the rear transmission line 9. Since the resonant frequency of the element shown in FIG. 1 is controlled by the lengths and material choices of the forward transmission line 8, and the rear transmission line 9, and the thickness of the ceramic disc 1, the diameter of the rear transmission line and the length and width of the forward transmission line and the ceramic disc can be made any value desired, provided all other resonances in these structures are kept well outside the operating frequency region of $f_L$.

Since the rear transmission material is usually metallic, it is an electrical conductor. Therefore, to make fabrication easier, the rear transmission line 9 can be attached to the bottom electrode of the ceramic disc 3 using a conductive cement, and the electrical lead 5 can then be electrically attached to the bottom of the rear transmission line 9 as shown using many different types of attachment means, such as solder or using electrically capsulating cement. The lead 5 could obviously also be attached to the ceramic directly. Electrical lead 4 is electrically attached to the top electrode of the ceramic disc 2.

Ultrasonic transducers are often used in echo-ranging distance measuring systems to detect the presence of objects and to determine the distance of the objects from the transducers. In these systems, the electronic circuitry causes a transducer to transmit a short pulse of ultrasonic sound into the air. The sound reflects from any objects in its path and returns to the transmitting transducer or to another transducer in the system. The receiving transducer converts the echo to an electronic signal that is detected by the electronic system. By measuring the time between transmission of the acoustic signal and the detection of the echo, the distance to the target can be calculated. For state-of-the-art ultrasonic transducers, the radiating surface of the transducer must be directly in contact with the transmission medium. This requires the transducers to either be mounted on the exterior surface of the structure holding the system, or they must be mounted into holes in the external surface of the structure holding the system. In all cases, the radiating surface of the transducer must be visible.

Figure 3:
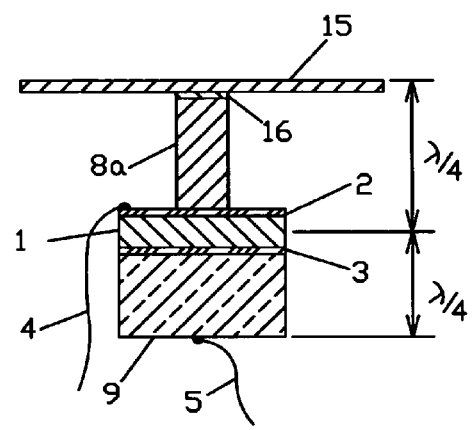
FIG. 3 is a schematic cross-sectional representation showing the half wavelength resonant structure of FIG. 1, except the forward acoustic transmission line for radiating sound into the medium has been modified to be a composite structure that is comprised of a portion of the rectangular forward transmission line of FIG. 1 and a thin portion of a sheet of material that has a much larger area than the area of the front surface of the rectangular forward transmission line.
Figure 4:
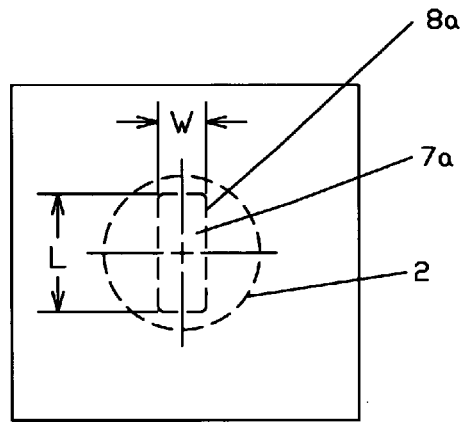
FIG. 4 is a top view of the structure shown in FIG. 3.

In many applications, such as automotive park assist systems, it is desirable for the ultrasonic transducers to be hidden so that they do not interfere with the lines of the smooth surfaces of the car bumpers or doors. FIG. 3 shows a schematic cross-section of a representation of a modification of the transducer shown in FIG. 1. FIG. 4 shows a top view of the structure of FIG. 3. This modification allows the transducer to be attached to the inside surfaces of the plastic bumper or the metal surface of the door or the side of the car's body. A transducer using this modification is capable of efficiently transmitting and receiving acoustic pulses with controlled radiation patterns through the continuous surface of a thin sheet of material. The forward quarter wavelength long transmission line of this transducer is a composite comprised of half of the thickness of the ceramic disc 1, the length of the rectangular structure 8a and the thickness of the large thin sheet of material 15. The dimensions of these are chosen so that the entire length of the composite structure is a quarter wavelength at the resonant frequency $f_L$. The rectangular structure 8a is the same as the rectangular structure 8 of FIG.

1, except it is slightly shorter. The sheet of material 15 is typically part of the smooth extension surface of the device or vehicle onto which the transducer is mounted, such as the plastic bumper of the metal surface of the door or car body. The rectangular structure 8a is mechanically attached to the thin sheet of material 15 by bonding and coupling means 16. This bonding means must acoustically couple the two structures and provide the necessary mechanical strength to hold the transducer structure together. It could be any of the many different epoxies and cements that are well known in the art. If external clamping means are provided to mechanically hold the transducer structure together, then coupling means 16 could be a viscous fluid that won't evaporate, such as grease or oil. In most cases, the relative thickness of coupling mean 16 is small compared to the length of the rectangular structure 8a and the thickness of the thin sheet of material 15, so it will have minimal influence of the resonant frequency of the forward quarter wavelength long transmission line.

In the structure shown in FIGS. 3 and 4, the motion of the molecules in the forward transmission line are primarily controlled by the rectangular structure 8a, because it makes up the major portion of the length of the composite structure. The thickness of the thin sheet of material 15 is therefore a relatively small portion of the quarter wavelength long composite structure. Because of this, when the transducer resonates the major motion of the molecules in the thin sheet of material 15 occurs only in the rectangular portion of the material that is connected to the rectangular structure 8a, which is W wide and L long. The large front surface of the thin sheet of material 15 is continuous and smooth, and the transducer structure behind it is not visible. However, in operation only the molecules of this thin sheet of material that are mechanically connected to the rectangular structure 8a will vibrate when the transducer is operated in the vicinity of the resonant frequency $f_L$. This will therefore produce a fan shaped acoustic beam from the large surface of the thin sheet of material 15 that has its horizontal and vertical beam angles controlled by the width W and length L of the rectangular structure 8a that is attached to the inside surface of the thin sheet of material.

It has been found in operation that unless the sheet of material 15 is extremely thin, the beam pattern can become distorted. The molecular motion can spread beyond the width W and the length L, and in addition, a larger portion of the sheet of material 15 can buckle and move causing further distortion to the acoustic radiation pattern. These unwanted motions can be reduced and eliminated by attaching a clamping means to the thin sheet of material 15 around the portion of the sheet that is W wide and L long and attached to the rectangular structure 8a.

The schematic resonator element structures shown in FIGS. 1, 2, 3, and 4 illustrate how using the technology of this invention, in combination with the teachings of my co-pending application, the basic resonator element design can be modified by one skilled in the art to produce hidden transducers with different radiation patterns. However, these structures are not usable unless they can be incorporated into a housing that will allow the transducer to be protected and mounted without affecting the electroacoustic responses. The housing structure should also provide the required clamping means to control the motion of the thin sheet of material 15.

Figure 6:
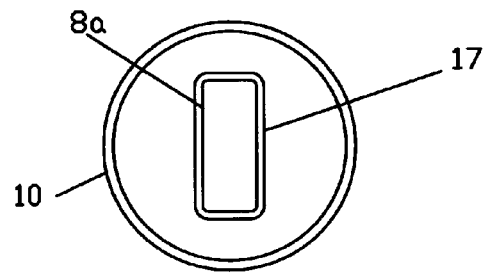
FIG. 6 is a top view of the structure shown in FIG. 5.
Figure 7:
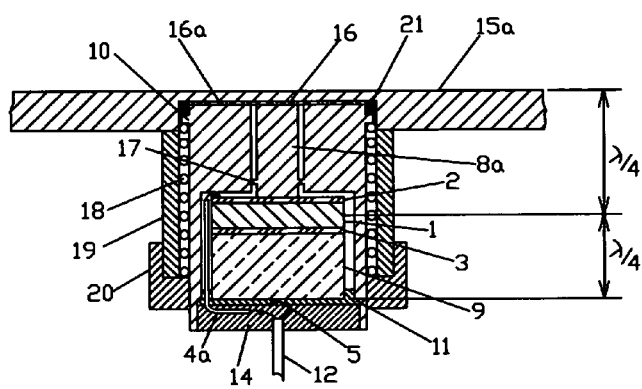
FIG. 7 is a cross-sectional view showing the transducer structure of FIG. 5 that has been mounted onto a thin portion of a sheet of material such as an automobile bumper.

FIG. 5 shows a schematic cross-sectional view of a transducer that is a preferred embodiment of this invention, and FIG. 6 is a top view of the structure shown in FIG. 5. This transducer structure only contains the rear transmission line 9, the ceramic 1 and the rectangular member 8a of the half wavelength transducer. The entire quarter wavelength long forward transmission line is not completed until this transducer is mounted onto the thin sheet of material 15, as shown in FIG. 7. The transducer shown in FIG. 5 contains a housing 10, which would typically be a molded plastic piece. The rectangular structure 8a that forms the major portion of the forward transmission line is part of the housing, but it is acoustically decoupled from the rest of the housing by the thin web of plastic material 17.

This web is an important feature of the housing structure. It is designed so that the stiffness of the web is low enough to ensure that the resonant frequency caused by the mass of the outer housing coupled by the web to the mass of the length resonator inside the housing will be much lower than the resonant frequency of the transducer $f_L$.

The web must also be thin enough to ensure that any acoustic vibration in the frequency region of $f_L$ is greatly attenuated as it tries to pass between the rectangular structure 8a and the rest of the housing 10. The web must be thick enough, however, to ensure that the structure of the transducer assembly is mechanically strong. This web also provides an environmental seal to the internal portion of the transducer assembly. The web can be located anywhere along the length of the rectangular structure 8a, but it is best to place the web closer to the ceramic disc 1. This is because in operation, the transducer creates at node with no motion at the center of the ceramic, and the displacement of the molecules along the rectangular structure 8a increase as the distance from the ceramic increases. Therefore, placing the web closer to the ceramic, usually within 0.1 $\lambda_L$, will locate it where there is less motion within the rectangular structure 8a when the transducer is operating at $f_L$, which in turn will reduce the acoustic coupling between the rectangular structure 8a and the rest of the housing 10. Because of this construction, only the front surface of the rectangular structure 8a vibrates when the transducer is operated in the vicinity $f_L$. The front surface of the outside portion of housing 10 will remain stationary and result in little or no vibrating during the operation of the transducer because there is little or no acoustic coupling through web 17. The front surface of the outside portion of the housing 10 is separated from the rectangular structure 8a by a narrow gap with a width G, which is also the width of the web 17. The front surfaces of the rectangular structure 8a and the rest of the housing 10 are mechanically located in the same plane.

The inventive transducer can be designed to operate at any one of a wide range of resonant frequencies, but for echo-ranging systems such as automotive park assist systems, it has been found that operation is best when the frequency $f_L$ is within the band of approximately 40 kHz to 60 kHz. If $f_L$ is much lower than approximately 40 kHz the transducer structure starts to become excessively large, and if $f_L$ is much higher than approximately 60 kHz the attenuation of sound in the transmission medium starts increasing to a level that the range of detection of targets is too short. For transducers operating in this frequency region, it has been found that webs with a thickness of approximately 0.015 inches and a gap G of approximately 0.06 inches work well.

As was discussed in my co-pending application, the top electrode 2 of the ceramic disc 1 can be attached to the rectangular structure 8a and the bottom electrode 3 can be attached to the rear transmission line 9 by using any of a wide variety of cements. Leads 4a and 5 are electrically attached to the ceramic electrodes and connected to electrical cable 12. Lead 4a contains an insulation coating to ensure that it does not make electrical contact with the rear transmission line 9. An isolation cap 11 mechanically holds the rear transmission line inside the housing. This isolation cap would typically be made of an acoustically lossy material such as Butyl rubber, a lossy plastic, or corprene. The surface area where the isolation cap touches the housing should also be kept to a minimum. The cavity in the housing 10 behind the isolation cap 11 can then be encapsulated with a material such as cement or polyurethane that will environmentally seal the back of the transducer assembly and also provide a strain relief for the cable 12. This is obviously only one of many ways of mechanically holding the resonator and environmentally sealing the transducer that will readily come to the mind of one skilled in the art.

FIG. 7 shows a cross-sectional view of the transducer of FIG. 6 mounted onto the rear portion of a thin sheet of material 15a, that could be the plastic of the bumper or the metal of the side of an automobile. The plastic material of an automobile bumper is typically acoustically lossy and is also relatively thick. Therefore, it has been found that the thickness of the plastic where the transducer is to be mounted will often have to be made thinner than the thickness of the rest of the bumper. This can be accomplished in many ways, such as by use of a secondary machining operation, or by molding that portion of the bumper to a smaller thickness. The cavity in the thin sheet of material 15a is made the proper diameter to allow the front of the housing 10 of the transducer shown in FIG. 5 to fit into it. The front surfaces of the transducer are attached to the inner surface of the cavity in the thin sheet of material 15a by using the bonding and coupling means 16a, which connects the front surface of the outer portion of housing 10 to the thin sheet of material 15a, and coupling means 16, which connects the front surface of the rectangular structure 8a to the thin sheet of material 15a. Bonding and coupling means 16 and 16a can be comprised of any number of materials, as discussed in connection with FIG. 3.

The forward quarter wavelength transmission line of the assembly consist of half of the thickness of the ceramic disc 1, the rectangular structure 8a, and the thickness of the portion of the thin sheet of material 15a attached to the rectangular structure 8a, as shown in FIG. 7. This construction therefore causes the molecules of the portion of the thin sheet of material 15a attached to the rectangular structure 8a to vibrate, thus producing efficient transmission and reception of sound with a fan shaped radiation pattern with beam angles controlled by the width W and the length L of rectangular structure 8a. Because the external portion of housing 10 is acoustically disconnected from the vibrating portion of the transducer by the web 17, the front surface of the external portion of housing 10 does not vibrate, as was previously discussed. Because of this, attachment means 16a causes the outer portion of the housing 10 to clamp the portion of the think sheet of material 15a that is in front of it. This clamping stabilizes the thin sheet of material 15a and reduces or eliminates the distortion of the acoustic radiation pattern that could occur without clamping as was previously discussed. It has been found that for the typical plastics used in automobile bumpers, the inventive transducer works best when the thickness of the material 15a in front of the surfaces of the transducers is between approximately 0.03 inches and 0.06 inches. If the thickness becomes less than approximately 0.03 inches, the structure becomes mechanically weaker, and as the thickness becomes greater than approximately 0.06 inches the acoustic performance of the transducer deteriorates.

A mounting tube 19 is connected to the thin sheet of material 15a. This mounting tube can be fastened rigidly to the inner portion of the thin sheet of material 15a, as shown, by any number of means that are well known in the art. For example, it could be cemented in place, welded in place, or molded as part of the fabrication of the thin sheet of material 15a if it is a plastic bumper. The ID of the mounting tube 19 is designed to allow the transducer housing 10 to fit inside with a spring 18 placed between the housing and the ID of the mounting tube. The spring 18 rests against the lip in the front of the housing as shown. The spring is then compressed and the locking cap 20 is inserted around the housing 10 and over the edge of the mounting tube 19. The spring 18 is compressed by the locking cap 20, which therefore provides a constant force to hold the face of the outer portion of the housing 10 and the outer surface of the rectangular structure 8a rigidly against the inner surface of the thin sheet of material 15a. An environmental seal can be provided to protect the bonding and coupling means 16 and 16a. This can be provided in many different ways. For example, either a gasket could be used or the O-ring 21 as shown in FIG. 7. This is obviously only one of the many ways of mechanically mounting the transducer onto the thin sheet of material that will readily come to the mind of one skilled in the art.

The inventive transducer used in combination with any of the many electronic echo-ranging systems that are well known in the art will produce a unique hidden transducer system that is highly desirable for automotive applications such as park assist systems. In such a system, hidden transducers such as those shown in FIG. 5 would be mounted into the front and rear bumpers of an automobile in the manor shown in FIG. 7. The length L and width W of the forward rectangular structures 8a would be designed so that the horizontal beam angle of the radiation pattern of the transducers would be relatively broad and the vertical beam angle would be relatively narrow. This broad horizontal beam would allow the transducers to detect targets located in positions in a relatively large area over the horizontal plane behind or in front of the vehicle. The narrower vertical angle, however, while allowing for detection of actual targets that are located behind or in front of the vehicle, would greatly reduce or eliminate false targets that could be produced by backscatter echo reflections from the irregularities in the road surface if the horizontal beam was large enough to insonify the road. It has been found that horizontal beam angles of approximately 80° to 100° and vertical beam angles of approximately 30° to 40° work well for most applications. Typically two to four transducers would be mounted on each bumper with the horizontal radiation patterns of adjacent transducers overlapping. This allows a target object to be within the detection patterns of multiple transducers. In operation, a single transducer can transmit a sound pulse and detect the return echo from a target, but an echo can also be detected by one or more adjacent transducers. In this manner, the redundancy of echoes from a single target received by multiple transducers will improve the probability of detection of targets that produce low amplitude echoes. In addition, because of the multiple transducers with multiple beams pointed in different directions, the system can determine the approximate side to side location of a target and report if it is directly in front of the vehicle, or if it is located to the left or right side. Additional transducers can be placed on the sides of the vehicle to determine the distance of targets such as walls or curbs to the side during parking.

FIG. 8 shows a schematic block diagram of one illustrative example of an automotive park assist system using the inventive hidden transducers. In operation the control logic 35 produces an electrical tone burst signal in the vicinity of the resonant frequency, $f_L$, of the hidden transducer 30. This tone burst passes through the transmit drive circuit 32 to increase its voltage, which could include circuitry such as a power amplifier and a transformer. The high voltage electrical drive signal then passes through the Transmit/Receive (T/R) circuit 31 and is applied to the hidden transducer 30. This causes the transducer to produce an acoustic transmit pulse 37, which travels through the air and reflects off of target 36. The acoustic echo pulse 38 is reflected from the target and travels back to the hidden transducer 30, where it is converted into an electrical signal. This received electrical echo signal then passes through the T/R circuit 31 to the input of the amplifier 33. The T/R circuit 31 protects the amplifier 33 from the high voltages of the transmit pulse by using circuit components such as back to back diodes, as is well known in the art. The output of the amplifier is fed into the detection circuit 34. This circuit will detect the presence of an echo signal by using any one of a number of well known detection methods. For example, it could contain a simple peak detector and threshold detector, or it could use autocorrelation or crosscorrelation technology. When an echo pulse arrives, the detection circuit 34 sends a signal, such as a logic level pulse, to the control logic 35. The control logic then measures the time from when electrical transmit pulse was generated to when the acoustic echo was received, and since the speed of sound in the air is known, the control logic calculates the distance target 36 is from the hidden transducer 30.

As was discussed, the echo-ranging system shown in FIG. 8 can contain a number of additional transducers. There can be several transducers located on the back bumper, several on the front bumper, and several on the sides of the vehicle. Each of these additional hidden transducers will be connected to the control logic 35 using similar circuit blocks as those just discussed. One additional transducer channel is shown in FIG. 8, as illustrated by hidden transducer 30*a*, T/R circuit 31*a*, transmit drive 32*a*, amplifier 33*a*, and detection circuit 34*a*. Even though only one additional transducer channel is shown, it is understood that it would be straightforward to add any number of transducer channels to the system. The control circuit 35 can operate each of these additional hidden transducer channels as stand alone echo-rangers. However, if any two hidden transducers have overlapping horizontal beams, than one transducer can transmit an acoustic pulse, but an echo can be reflected to and received by two or more transducers, as shown by acoustic echo pulses 38 and 38*a* in FIG. 8. Both of these echoes can then be detected and processed by control logic 35 to better determine the location of the target 36. All of this signal processing is well known in the art and is not unique in the inventive system. What is unique is the use of invisible transducers in combination with the electronics in the system, which solves a major problem that exists with all prior art systems where styling is important, such as in automotive park assist systems.

In a system such as that illustrated in FIG. 8, the control logic 35 can use the detected echo signals from hidden transducers located on the rear bumper, the front bumper, or the sides of the vehicle to detect the presence of target objects and their distance and position relative to the vehicle. The control logic 35 will then produce output signals 40 that are used to display the location of these target objects to the driver. This display could be presented in many different forms, such as an audio output stating the relative positions of target objects, or a visual display in which the targets are shown pictorially relative to the vehicle. Electronic echo-ranging systems such as the one shown in FIG. 8 are well known in the art and are commonly used in automotive park assist systems. However, all current state of the art systems require the ultrasonic transducers to be exposed. This causes the face of the transducer to "break up" the smooth lines that were designed into the surface of the vehicle, which is a major disadvantage to these existing systems. The unique inventive system shown in FIG. 8 is a significant improvement over existing state of the art systems because it produces an automotive park assist system that does not interfere with the smooth lines designed into the vehicle since it utilizes the unique hidden transducers.

I claim:

1. In combination in an electroacoustic transducer, a partial transducer, a thin sheet of material, and a method of acoustically connecting said partial transducer to said thin sheet of material so that the thin sheet of material become part of the resonator structure of said electroacoustic transducer, said partial transducer characterized in that it contains a partial resonator structure consisting of at least one piezoelectric component having a forward and rear parallel plane surface, an electrode attached to said parallel plane surface, electrical conducting means attached to each said electrode, a front partial acoustic transmission line, a rear acoustic transmission line, said acoustic transmission lines characterized in that they each contain two parallel surfaces, and one of the parallel surfaces of each acoustic transmission line is further characterized in that they are connected by attachment means, one to each of said parallel plane surfaces of said piezoelectric component, and said rear transmission line is further characterized in that the length between the two parallel surfaces plus half of the thickness of said piezoelectric component is approximately ¼ wavelength in the vicinity of the frequency of the length resonance, $f_L$, of said resonating structure, attachment means for acoustically coupling the front surface of the front partial acoustic transmission line to said thin sheet of material so that the forward portion of said resonator structure consists of the combination of said thin sheet of material, said front partial acoustic transmission line, plus half of the thickness of said piezoelectric component, and the forward portion of said resonator structure is further characterized in that the length of the combined structure is approximately ¼ wavelength in the vicinity of the frequency of the length resonances, $f_L$, of said resonating structure.

2. The invention of claim 1 characterized in that the front surface of said thin sheet of material in said electroacoustic transducer is a radiating surface that is acoustically coupled to a fluid medium that is capable of transmission of acoustic energy at frequencies in the vicinity of $f_L$.

3. The invention of claim 1 characterized in that said partial transducer contains a housing with attachments means that mechanically holds said partial resonator structure securely into said housing with the radiating surface of said front partial acoustic transmission line located at the front surface of said housing, and disconnection means to acoustically disconnect said partial resonator structure from the housing in the vicinity of the length resonance, $f_L$, of said resonating structure.

4. The invention of claim 3 characterized in that the size of said front parallel surface of said front partial acoustic transmission line is set so that the ratio of the length of a line across the surface and through the center at any given angle divided by the wavelength of sound in said fluid medium at a frequency in the vicinity of $f_L$ will be the proper value to produce the desired radiating beam pattern of acoustic energy into the fluid medium in a plane characterized in that it is perpendicular to the radiating surface and further characterized in that the intersection of said plane and said radiating surface is also perpendicular to said line across the surface.

5. The invention of claim 4 characterized in that said disconnection means is a thin web of material, said thin web characterized in that it is mechanically attached to both said housing and said front partial acoustic transmission line, and still further characterized in that its stiffness is low enough to ensure that the resonant frequency of the mass of the housing coupled by the thin web to the mass of the remainder of the structure of the partial transducer is lower than $f_L$.

6. The invention of claim 5 characterized in that said thin web is a plastic material, and further characterized in that the thickness of said web is in the range of 0.005 inches and 0.020 inches.

7. The invention of claim 5 characterized in that the material of said thin web and said forward partial transmission line is plastic, and further characterized in that said thin web is attached to said front partial transmission line, and still further characterized in that said thin web is attached to the front partial transmission line close to the ceramic at a distance between approximately $0.05 \lambda_L$ and $0.15 \lambda_L$.

8. The invention of claim 5 characterized in that the material of said housing is plastic and the front surface of the parallel surface of said front partial acoustic transmission line is in the same plane as said outside portion of the front surface of said housing, said housing further characterized in that said outside portion of the housing and said front partial acoustic transmission line are separated by a narrow gap with a width G.

9. The invention of claim 8 characterized in that the length resonant frequency, $f_L$, of said electroacoustic transducer is between approximately 40 kHz and 60 kHz, and the width G of said narrow gap is between approximately 0.02 inches and 0.1 inches.

10. The invention of claim 9 characterized in that said thin sheet of material consists of a portion of the outside structure of an object, such as an automobile bumper, mirror housing, or sheet metal, said outside structure further characterized in that its thickness is made sufficiently thin in the area where said partial transducer mounts so as to both ensure that after said front partial acoustic transmission line is acoustically coupled to said thin sheet of material, this combination front acoustic transmission line causes the electroacoustic transducer to resonate at the proper length resonant frequency, $f_L$, and also to ensure that the acoustic energy efficiently radiates from the outside surface of the thin sheet of material, bonding means to ensure that outside portion of the housing is rigidly attached to said thin sheet of material in a manner to ensure that the radiation pattern of the sound emitting from the outside surface of the thin sheet of material will be controlled by the dimensions of said front parallel surface of the partial forward transmission line.

11. The invention of claim 10 characterized in that said acoustic radiation pattern is fan shaped in that it is wider in one plane than it is in the orthogonal plane, and further characterized in that said front parallel surface of said front partial acoustic transmission line is rectangular in shape.

12. The invention of claim 10 and mounting means characterized in that it maintains a compressive force between said partial transducer and said thin sheet of material, said mounting means contains coupling means between said partial transducer and said thin sheet of material to ensure proper acoustic coupling, and also contains bonding means to provide proper rigid attachment to said outside portion of the housing to said thin sheet of material to properly control the acoustic radiation pattern.

13. In an electroacoustic object detection system, hidden transducer means, said hidden transducer means characterized in that it contains a length resonator that resonates at the operating frequency of $f_L$, said hidden transducer further characterized in that it contains a rear acoustic transmission line and a front acoustic transmission line, said front acoustic transmission line being comprised of a front partial acoustic transmission line acoustically coupled to a thin sheet of material, said front and rear acoustic transmission lines characterized in that their lengths are each $\lambda/4$ in the vicinity of $f_L$, system mounting means to hold the structure of the transducer behind the thin sheet of material so that it is not visible from the front of said thin sheet of material, said electroacoustic object detection means further characterized in that it contains an electronic system characterized in that it contains transmit means to apply a transmit electrical tone burst to said hidden transducer, and detection means to detect any return acoustic echoes from reflecting targets.

14. The invention of claim 13 characterized in that the thin sheet of material is an exterior automotive skin such as a bumper, minor housing or sheet metal.

* * * * *